(12) United States Patent
Symonds

(10) Patent No.: US 6,468,612 B1
(45) Date of Patent: Oct. 22, 2002

(54) SNO-PROTECTOR

(76) Inventor: Loran S. Symonds, Rte. 4, Box 793, Newberry, MI (US) 49868

( * ) Notice: Subject to any disclaimer, the term of this patent is extended or adjusted under 35 U.S.C. 154(b) by 72 days.

(21) Appl. No.: 09/783,077

(22) Filed: Feb. 15, 2001

Related U.S. Application Data
(60) Provisional application No. 60/193,233, filed on Mar. 30, 2000.

(51) Int. Cl.[7] ................................................. B32B 1/02
(52) U.S. Cl. ........................ 428/35.7; 428/99; 150/166; 296/136
(58) Field of Search ........................ 428/99, 34.1, 35.7; 150/166, 167; 296/136; 280/770

(56) References Cited

U.S. PATENT DOCUMENTS

| | | | |
|---|---|---|---|
| 3,721,467 A | 3/1973 | Kerr | 296/28 M |
| 5,458,945 A | 10/1995 | Tall | 428/100 |
| D371,106 S | 6/1996 | Taylor et al. | D12/402 |
| D377,928 S | 2/1997 | Tillery | D12/401 |
| D391,219 S | 2/1998 | Voorhees | D12/402 |

Primary Examiner—Alexander S. Thomas
(74) Attorney, Agent, or Firm—Patent & Trademark Services; Thomas Zack; Joseph H. McGlynn

(57) ABSTRACT

A light weight plastic cover for a snowmobile that is locked in place on an enclosed snowmobile by a pair of lower bars. The cover is a hollow plastic molded cover which has two spaced pairs of through side holes located near its opened bottom. A plastic bar fits into each pair of aligned through holes and under the snowmobile. Each bar end and has a removable end nut. The cover has an opened bottom and a canvas material may be added to cover this bottom. Two holed rolled ends on the bottom material act to receive the retaining bars to form a complete cover enclosure. The snowmobile is confined within the formed enclosure with the bars locked in place near its bottom. The upper surface of the cover may have two ski surfaces molded into it. By turning the cover upside down, these cover skis surfaces engage the ground which then allow the cover's top surface to act as a sled to be pulled by the snowmobile, by hand or any other means desired.

6 Claims, 5 Drawing Sheets

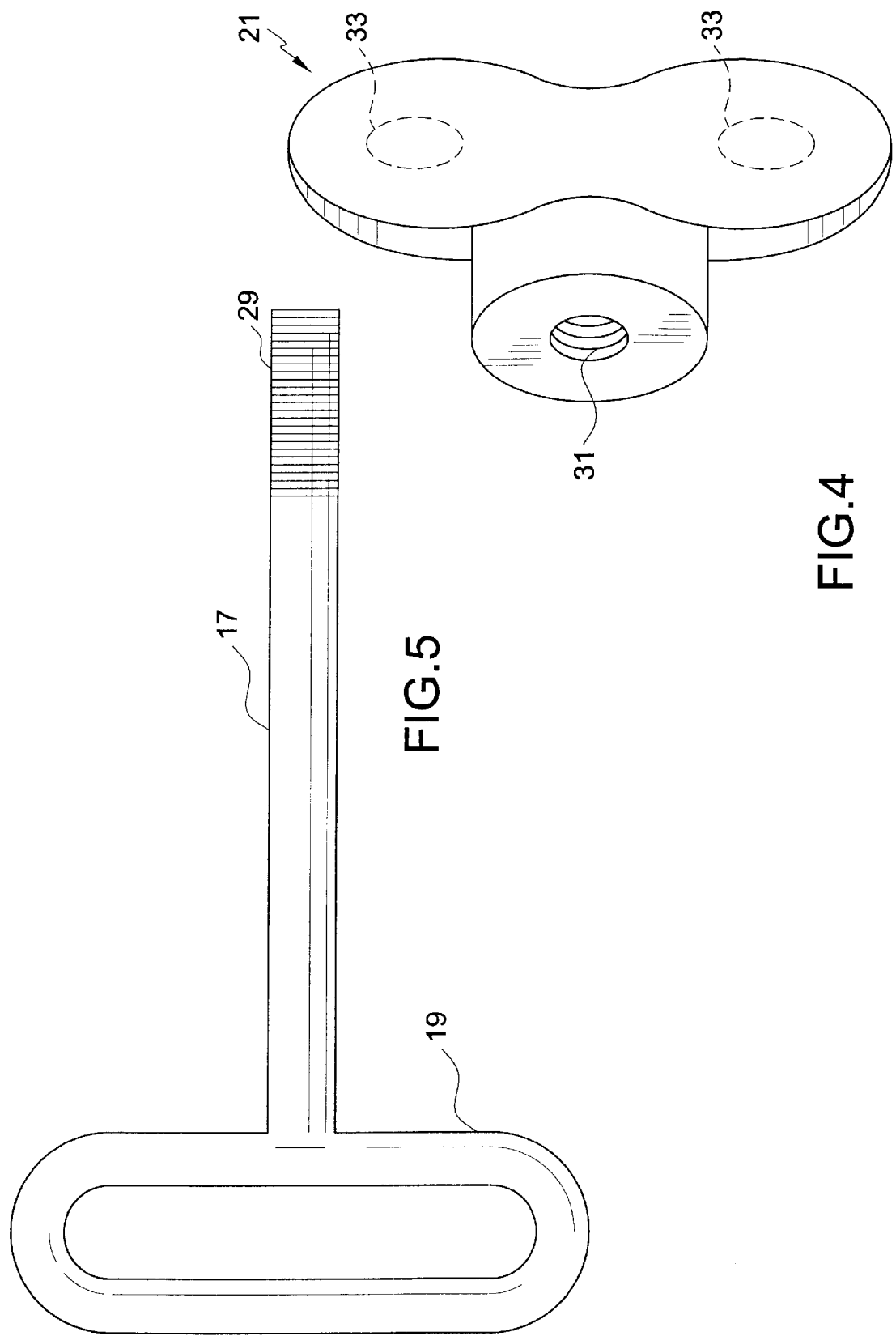

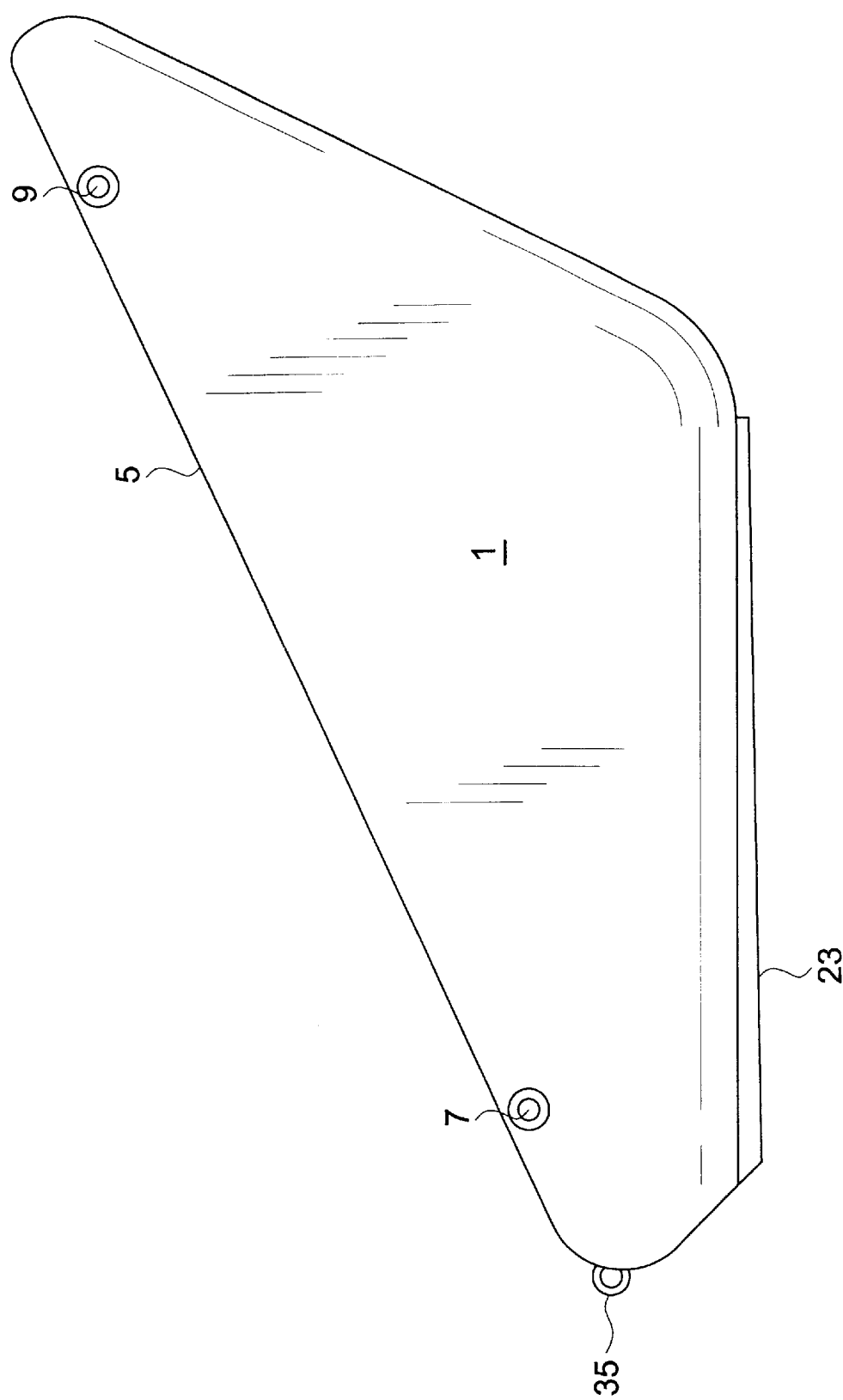

SNO-PROTECTOR

This invention claims the benefit of the U.S. Provisional application No. 60/193,233 filed on Mar. 30, 2000.

BACKGROUND OF THE INVENTION

This invention relates to a cover for a snowmobile.

Covers of many different types have been used for snowmobiles or the like. For example, in one design patent a storage bag for a bicycle is disclosed that has attaching straps. Another design patent invention for a cover is used for an automobile.

Still another prior art design patent discloses a cover for small automobile. While another prior art invention discloses a molded plastic snowmobile cover attached to a trailer by clamps.

Still another invention discloses a cover for the front of a snowmobile secured by straps.

DESCRIPTION OF THE PRIOR ART

Covers, especially those for snowmobiles, vehicles and the like, have been constructed in a vary of ways. Normally, these covers are used when the covered snowmobile or vehicle is either transported, such as by a trailer, or stored. For example, in the U.S. Design Pat. 371,106 to Taylor et al. there is disclosed a storage bag for a bicycle that has attaching straps.

U.S. Design Pat. 377,928 to Tillery discloses a discloses a cover for automobile.

U.S. Design Pat. 391,219 to Voorhees discloses a a cover for a small vehicle.

U.S. Pat. No. 3,721,467 to Kerr discloses a molded plastic snowmobile cover attached to a trailer by clamps.

U.S. Pat. No. 5,428,945 to Tall discloses a cover for the front of a snowmobile secured by straps.

In the present invention a cover for a snowmobile is attached to the snowmobile by a pair of bars that pass through the snowmobile cover beneath the snowmobile to lock the cover in place all as will be detailed in the specification that follows hereafter.

SUMMARY OF THE INVENTION

This invention relates to cover for a snowmobile that is locked in place on the snowmobile by a pair of bars.

It is the primary object of the present invention to provide for an improved snowmobile cover.

Another object is to provide for such a dual functioned cover wherein the snowmobile cover may also be used for a trailer or sled with built-in skis by turning the cover upside.

These and other objects and advantages of the present invention will become apparent to readers from a consideration of the ensuing description and the accompanying drawings.

BRIEF DESCRIPTION OF THE DRAWINGS

FIG. 4 is a perspective enlarged view of one of the cover retaining wing nut bars.

FIG. 5 shows the cover retaining bar in a side view.

FIG. 6 is an upside down side view of the cover showing the cover used as a trailer.

DESCRIPTION OF THE PREFERRED EMBODIMENT

Figure 1:
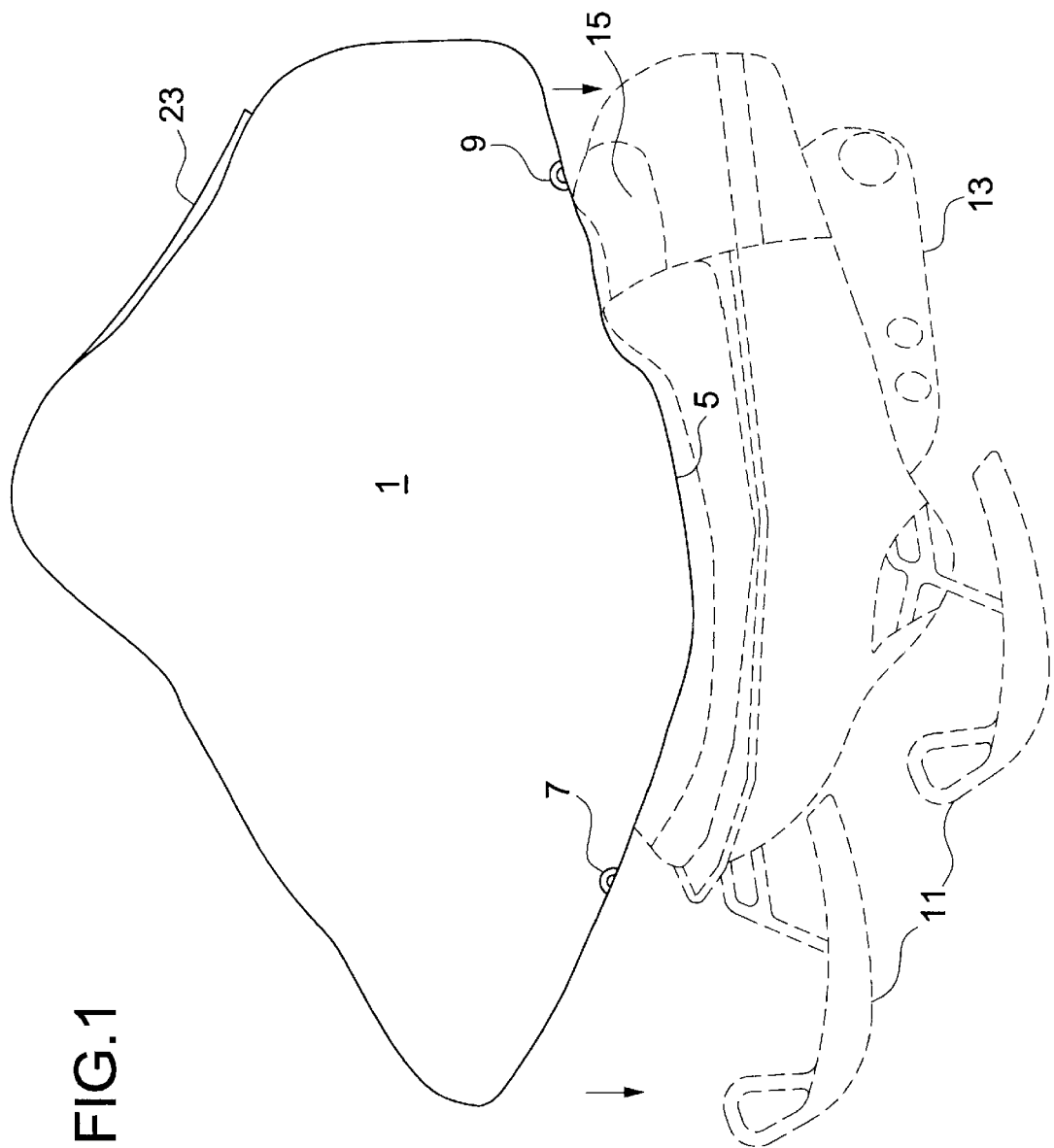
FIG. 1 is a side view of the present invention showing it being placed over a snowmobile.

FIG. 1 is a side view of the present invention showing the cover 1 being placed over a conventional snowmobile 3, shown in dotted line format. The cover 1 is made of a hollow molded plastic material that may be clear or colored, as desired, with or without indicia. The cover is shaped and sized to fit over the snowmobile and has the same general shape and size as the snowmobile. All top and side surfaces of the cover are enclosed while the bottom 5 is opened so that the cover may fitted from above over (see arrows) the lower snowmobile.

Molded into the plastic material forming the cover 1 are two spaced bar receiving holes 7 and 9 located on each side of the cover. Two aligned lower cover holes spaced the same distance apart as holes 7 and 9 are also located and molded into the opposite side of the cover. These bar receiving hole pairs permit two identical cover retaining bars (see FIG. 4) to be inserted widthwise across the in-place cover to retain the cover over the snowmobile. As is shown in FIG. 3, the two retaining bars act are used to lock the cover to the snowmobile and also, at the same time, to retain an added canvas bottom that may fit under the snowmobile.

The snowmobile 3 of FIG. 1 is conventional in design and is shown with a pair of front steerable skis 11 and a rear motor driven track 13. When operating the snowmobile, the user would be in a seated position in the seat 15 with controls for the gasoline powered motor and the steering mechanism. Clearly, since the cover 1 complements the design and size of the snowmobile, variations in shape and size for the cover are contemplated depending on the specific snowmobile that is to be covered.

Figure 2:
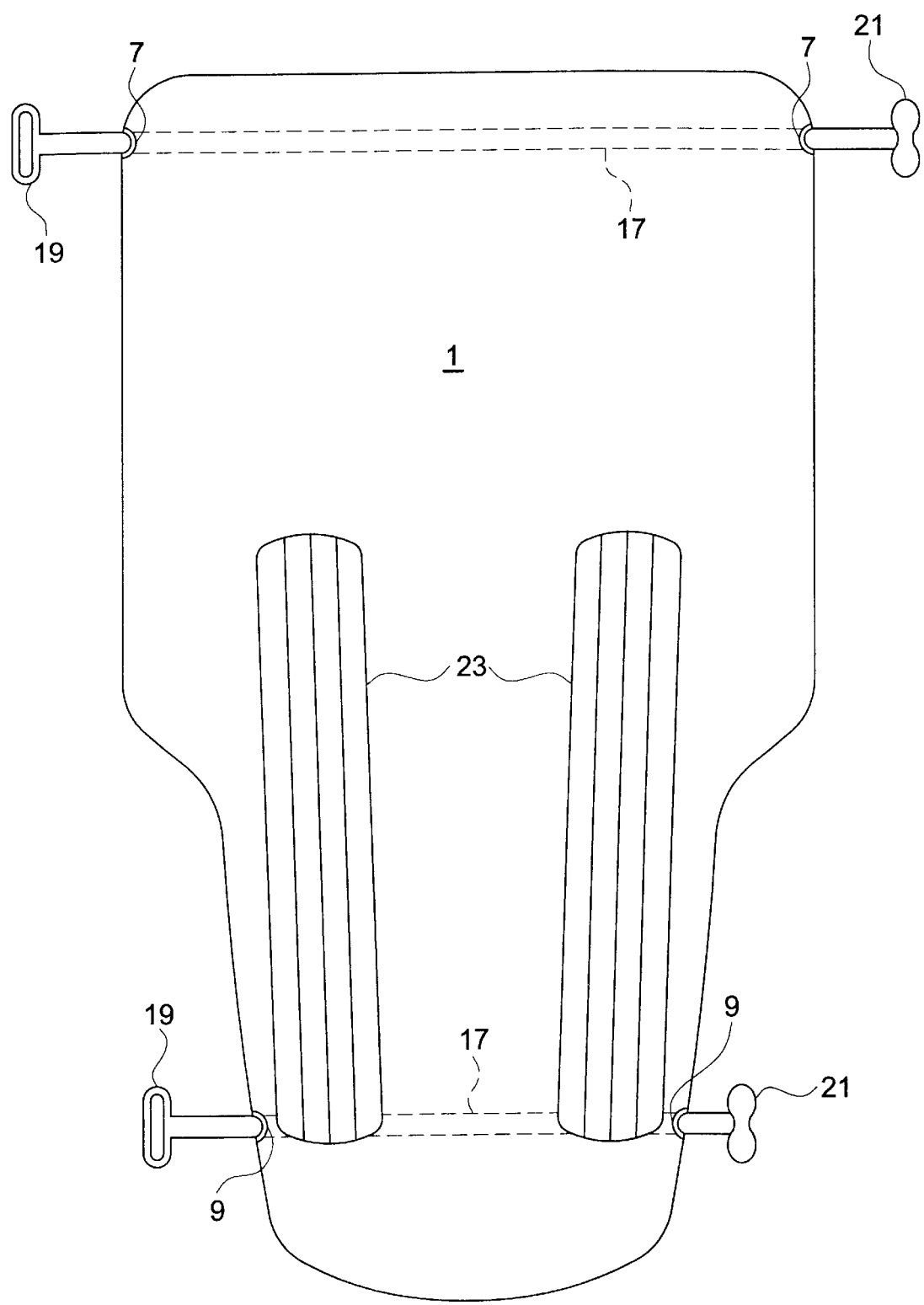
FIG. 2 is a top view of the cover shown in FIG. 1.

FIG. 2 is a top view of the cover 1 shown in FIG. 1 without the snowmobile 3. The two pairs of aligned holes 7 and 9 in the cover's lower side portions each of which was previously described. Two bars 17 extends widthwise of the cover and one is inserted in each pair of holes. Each straight bar 17 is identical and has one end 19 with an enlarged retaining nut fixed to the bar. The opposite free end of the bar has a removal threaded wing type nut 21. This configuration of the bar permits each bar to be inserted at its free end through an aligned pair of holes and then to be locked in place by threadedly mounting nut 21 on the first inserted free bar end. On the upper or top rear surface of cover 1 are two plastic skis 23 molded into the surface of the cover. The two parallel ski surfaces 23 extend lengthwise of the cover and up from the surface of the cover to act as ground engaging surfaces when the cover is turned upside down as best shown in FIG. 5.

Figure 3:
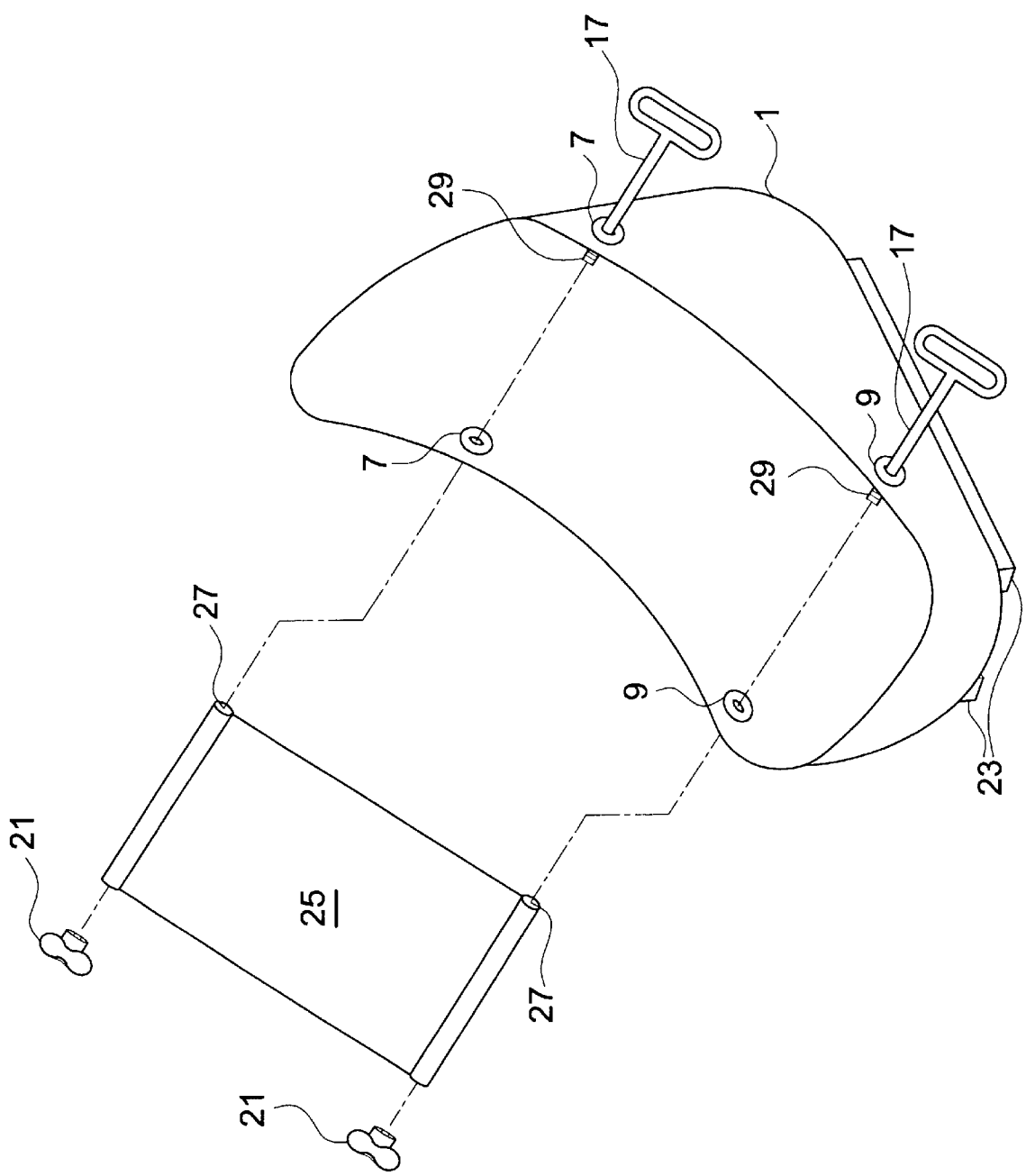
FIG. 3 is a bottom perspective view of the cover showing the bottom and retaining bars separately.

FIG. 3 is a bottom perspective view of the cover 1 showing the bottom and the retaining bars 17 separately. Added in this figure is a canvas bottom member 25 having two rolled ends each with through holes 27. The formed rolled ends may be formed by turning the canvas ends around a spindle and then sewing them to the canvas material. These holes permit the insertion of one of the retaining bars 17 into each hole. Once a bar 17 is inserted through the pair holes in the plastic cover (7 or 9) the bar can also extend through a end hole the bottom member 25 to also retain the bottom member 25 in place to the cover. Since canvas is a relatively soft flexible material, the member 25 can be rolled on itself when not in use.

This same flexible characteristic of the member 25 allows the bottom material to conform to the undercarriage surface of the snowmobile when placed under it. To lock the two inserted bars 17 in place, the free threaded ends 29 on each bar engage internal threads 31 within the wing nut removable ends 21. The molded aligned side hole pairs (7 and 9) in the cover 1 act in conjunction with the bars 17 and bottom member 25 to substantially cover the snowmobile on all sides and to protect it from the weather and other elements, such as road salt, slush, snow, etc.

Additionally, the hard plastic material making up the cover 1 is both light weight and easy to clean while providing a protective cover to the snowmobile from rot, fading and the elements. Using light weight plastic material makes it very easy to place the covering over the snowmobile to permit its transport, storage or display. Preferably the plastic material used to make the cover should be a recyclable plastic.

FIG. 4 is a perspective enlarged view of one of the cover retaining wing nut bars 21. The internal bore hole threads 31 of the wing nut are made to engage the external threads 29 on the free end of the retaining bar 17 as shown in FIG. 5. Through holes 33, shown in dotted line format, may be place in the wing handle of nut 21 to both reduce the weight of the nut and to add a decorative touch. Both the bar 17 and nut 21 may be made from a hard plastic material, such as ABS (Acrylonitrile-butadiene-styrene) plastic that is both strong, lightweight and not subject to rust.

FIG. 6 is an upside down side view of the cover 1 showing the cover used as a trailer. In this figure the cover 1 is slightly different in overall exterior configuration from the embodiment shown in FIG. 1. The cover's normally opened bottom side 5 faces up with the two molded cover skis 23 engaging the snow or ground. An added tow rope loop 35 may be molded into the front surface of the cover 1 to permit a rope or other trailing member on the snowmobile to attach the cover to the rear of the snowmobile and pull the cover and its contents along.

If desired, the cover could be pulled along the ground by a hand held tether. In any event by making the skis molded into the outside top surface of the cover a dual function is provided for namely, a protective cover and a pullable sled when turned upside down. The removable canvas bottom 25 may be added to the upside down cover 1 to provide an upper cover top held in place by the inserted bars 17 in the same fashion while in an upright position. This arrangement would provide for a top cover for the sled.

Although the preferred embodiment of the present invention and the method of using the same has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

What I claim as my invention is:

1. A cover for a snowmobile comprising:
   a cover mountable over a snowmobile and substantially covering the snowmobile except for an opened bottom,
   said cover having two sides each side having, two lower spaced holes extending through the cover,
   one hole on each side being aligned with another hole on the other side of the cover;
   two straight bars each with a free end,
   one of said bars being insertable at the free end into each of the holes located on a side of the cover and extending into an aligned hole on the other side of the cover; and
   locking means for locking the inserted free end of each bar in place under the snowmobile with the cover over the snowmobile.

2. The cover for a snowmobile as claimed in claim 1, wherein said cover is made of a hollow molded plastic material that is shaped and sized with substantially the same shape and size of the snowmobile which is to be covered.

3. The cover for a snowmobile as claimed in claim 2, wherein the cover has a top surface with two molded cover skis,
   said top surface being usable as a sled for the snowmobile when the cover is turned upside down with the opened bottom up.

4. The cover for a snowmobile as claimed in claim 3, wherein cover also includes a bottom cover for the snowmobile that is retained in place by the two straight bars.

5. The cover for a snowmobile as claimed in claim 4, wherein the locking means for locking the inserted free end of each bar are nuts.

6. The cover for a snowmobile as claimed in claim 5, wherein each of the free ends of the straight bars is threaded to engage threads on the locking handled nuts.

* * * * *